(12) United States Patent
Shiraishi et al.

(10) Patent No.: US 11,549,572 B2
(45) Date of Patent: Jan. 10, 2023

(54) TORSIONAL VIBRATION DAMPER

(71) Applicant: Toyota Jidosha Kabushiki Kaisha, Toyota (JP)

(72) Inventors: Yu Shiraishi, Susono (JP); Masayuki Ishibashi, Numazu (JP); Hideyuki Nishida, Sunto-gun (JP); Hiroyuki Amano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/557,791

(22) Filed: Dec. 21, 2021

(65) Prior Publication Data

US 2022/0221037 A1 Jul. 14, 2022

(30) Foreign Application Priority Data

Jan. 8, 2021 (JP) .............................. JP2021-002098

(51) Int. Cl.
*F16H 45/02* (2006.01)
*B60K 6/48* (2007.10)
*B60K 6/40* (2007.10)

(52) U.S. Cl.
CPC ................ *F16H 45/02* (2013.01); *B60K 6/40* (2013.01); *B60K 2006/4825* (2013.01); *F16H 2045/0263* (2013.01)

(58) Field of Classification Search
CPC ............. F16H 45/02; F16H 2045/0263; F16H 2045/0226; F16H 2045/0252; F16F 15/18
See application file for complete search history.

(56) References Cited

U.S. PATENT DOCUMENTS 10,288,158 B2 * 5/2019 Saka ..................... F16F 15/145
10,533,650 B2 * 1/2020 Nakamura .......... F16F 15/1202

FOREIGN PATENT DOCUMENTS

JP           2013-92183 A     5/2013

* cited by examiner

*Primary Examiner* — Huan Le
(74) *Attorney, Agent, or Firm* — Oblon, McClelland, Maier & Neustadt, L.L.P.

(57) ABSTRACT

A torsional vibration damper having improved vibration damping performance. The torsional vibration damper comprising: a pendulum vibration damper that damps pulsation of engine torque by an oscillating motion of an inertia body in response to the pulsation of the torque; and an engagement device that damps the amplitude of the pulsation of the engine torque by a relative rotation of rotary members. The pendulum vibration damper and the engagement device are arranged in order on a transmission route of the torque of the engine from a side at which the engine is disposed.

8 Claims, 5 Drawing Sheets

TORSIONAL VIBRATION DAMPER

The present disclosure claims the benefit of Japanese Patent Application No. 2021-002098 filed on Jan. 8, 2021 with the Japanese Patent Office, the disclosure of which is incorporated herein by reference in its entirety.

BACKGROUND

Field of the Disclosure

Embodiments of the present disclosure relate to the art of a torsional vibration damper having a pendulum damper that damps torsional vibrations resulting from a torque pulse by an oscillating motion of an inertia body.

Discussion of the Related Art

JP-A-2013-92183 describes a vibration damping device that damps pulsation of an engine torque. The vibration damping device taught by JP-A-2013-92183 comprises: a dynamic damper including a rotating body and an inertia mass body housed in a housing chamber; and a clutch mechanism for selectively interrupting torque transmission between the dynamic damper and the engine. The vibration damping device taught by JP-A-2013-92183 further comprises: an axis deviation prevention mechanism for keeping a rotation axis line of the rotating body on a rotation axis line of an output shaft of the engine by manipulating the clutch mechanism.

In the vibration damping device taught by JP-A-2013-92183, the inertia mass body is allowed to oscillate by engaging the clutch mechanism so as to damp torsional vibrations resulting from the pulsation of the engine torque. According to the teachings of JP-A-2013-92183, the clutch mechanism transmits torque from an input rotary member to an output rotary member while damping pulsation of the torque by causing the rotary members to slip. That is, the clutch mechanism serves as a damping device. However, if the rotary members of the clutch mechanism rotate while slipping, the numbers of torque pulses of the input rotary member and the output rotary member per rotation deviate from each other, and consequently the vibration damping performance of the dynamic damper would be reduced.

SUMMARY

Aspects of embodiments of the present disclosure have been conceived noting the foregoing technical problem, and it is therefore an object of the present disclosure to provide a torsional vibration damper having improved vibration damping performance.

According to the exemplary embodiment of the present disclosure, there is provides a torsional vibration damper comprising: a pendulum vibration damper that damps an amplitude of pulsation of torque delivered thereto from an engine by an oscillating motion of an inertia body in response to the pulsation of the torque; and an engagement device having a pair of rotary members that damps the amplitude of the pulsation of the torque by allowing the rotary members to rotate at different speeds while transmitting the torque therebetween. In order to achieve the above-explained objective, according to the exemplary embodiment of the present disclosure, the pendulum vibration damper and the engagement device are arranged in order on a transmission route of the torque of the engine, from a side at which the engine is disposed.

In a non-limiting embodiment, the pendulum vibration damper may be tuned to equalize the number of oscillations of the inertia body per revolution with the number of pulsations of the torque of the engine per revolution.

In a non-limiting embodiment, the torsional vibration damper may further comprise: a housing that is rotated integrally with an input shaft to which the torque is delivered from the engine; and a fluid coupling that transmits the torque to an output shaft through a fluid held in the housing. The pendulum vibration damper may be connected to an outer surface of the housing. In addition, one of the rotary members may be connected to the input shaft, and the other one of the rotary members may be connected to the output shaft.

In a non-limiting embodiment, the housing may include a projection protruding therefrom in an axial direction. In addition, the pendulum vibration damper may be mounted on of the projection, and the engagement device may be arranged in a radially inner side of the projection.

In a non-limiting embodiment, the housing may include an annular plate section connected to the input shaft to serve as said one of the rotary members of the engagement device, and the pendulum vibration damper may be connected to the annular plate section. In addition, said other one of the rotary members of the engagement device may be arranged in the housing.

In a non-limiting embodiment, the torsional vibration damper may further comprise: a housing that is rotated integrally with an input shaft to which the torque is delivered from the engine; and a fluid coupling that transmits the torque to an output shaft through a fluid held in the housing. The pendulum damper may be held in the housing, and the pendulum vibration damper may further comprise a rotating body connected to the input shaft. The rotating body may serve as one of the rotary members of the engagement device, and the other one of the rotary members may be connected to the output shaft.

In a non-limiting embodiment, the torsional vibration damper may further comprise a motor that is connected to the transmission route of the torque. The motor may damp the amplitude of the pulsation of the torque generated by the engine, by generating a torque pulsating in an opposite phase to a phase of the pulsation of the torque generated by the engine.

In a non-limiting embodiment, the motor, the pendulum vibration damper, and the engagement device may be arranged in another housing.

In a non-limiting embodiment, the torsional vibration damper may further comprise a spring damper including: an input plate that is connected to the engine; an output plate that is allowed to rotate relatively to the input plate; and an elastic member that is arranged in rotational directions of the input plate and the output plate.

Thus, in the torsional vibration damper according to the exemplary embodiment of the present disclosure, the pendulum damper and the engagement device are arranged in order on the transmission route of the engine torque from the side at which the engine is disposed. In other words, the pendulum damper is disposed upstream of the engagement device on the transmission route of the engine torque. As described, the pendulum vibration damper is tuned to equalize the number of oscillations of the inertia body per revolution with the number of pulsations of the engine torque per revolution. According to the exemplary embodiment of the present disclosure, therefore, the pulsation of the engine torque can be damped effectively by the pendulum damper before the number of pulsations of the engine torque per revolution is changed by the engagement device. For this reason, the vibration damping performance of the torsional vibration damper can be improved.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
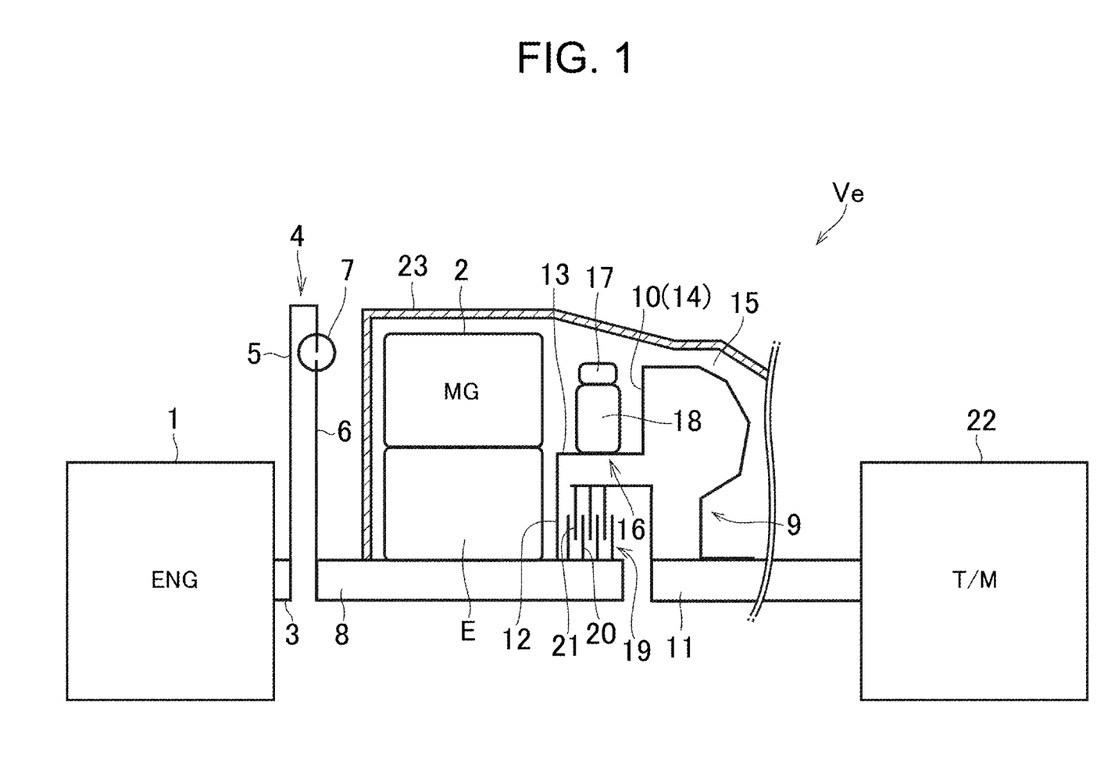
FIG. 1 is a schematic illustration showing a first example of the torsional vibration damper according to the present disclosure arranged in a vehicle.

Embodiments of the present disclosure will now be explained with reference to the accompanying drawings. Turning now to FIG. 1, there is shown one example of a structure of a vehicle Ve having a torsional vibration damper according to the first example of the present disclosure. As illustrated in FIG. 1, the vehicle Ve is a hybrid vehicle in which a prime mover includes an engine (referred to as "ENG" in the drawings) 1 and a motor (referred to as "MG" in the drawings) 2.

For example, an internal combustion engine such as a gasoline engine and a diesel engine may be adopted as the engine 1, and an output torque of the engine 1 may be changed by controlling Ing an air intake and a fuel injection.

The output torque of the engine 1 is pulsated inevitably due to combustion of cylinders. For example, given that a four-stroke gasoline-fueled internal combustion engine is adopted as the engine 1, each piston completes four separate strokes while turning an output shaft 3 of the engine 1. Specifically, each piston experiences two strokes per revolution of the output shaft 3 in the following order: an intake stroke in which air-fuel mixture is pulled into the cylinder; a compression stroke in which the air-fuel mixture is compressed by the piston; a combustion stroke in which the compressed air-fuel mixture is ignited; and an exhaust stroke in which a resultant exhaust gas is expelled from the cylinder. That is, in the four-stroke engine, combustion of the air-fuel mixture takes place two times in the cylinder per revolution, and as a result, the output torque of the engine is pulsated two times per crankshaft revolution. An amplitude of the pulsation of the output torque of the engine 1 is increased within frequencies as a product of: the number of torque pulses per revolution corresponding to half the number of cylinders; and a current rotational speed of the engine 1.

The output shaft 3 of the engine 1 is joined to a spring damper 4 as a conventional spring damper. Specifically, the spring damper 4 comprises an input plate 5 that is joined to the output shaft 3 of the engine 1, an output plate 6 that is allowed to rotate relatively to the input plate 5, and one or more coil springs 7 as an elastic member. The coil spring 7 is contracted in a rotational direction by a relative rotation between the input plate 5 and the output plate 6 due to pulsation of the torque delivered to the input plate 5. Consequently, the pulsation of the torque being delivered from the input plate 5 to the output plate 6 is damped by the coil spring 7.

The output plate 6 is joined to an output shaft 8 of the spring damper 4, and the output shaft 8 is connected to the motor 2 in a torque transmittable manner. As the conventional motors adopted as prime movers of hybrid vehicles and electric vehicles, the motor 2 serves not only as a motor to generate an output torque when supplying electricity thereto, but also as a generator to convert a kinetic power of an output shaft thereof into an electric power when generating a torque in a direction to reduce a rotational speed of the output shaft thereof. For example, a synchronous motor in which permanent magnets are arranged in a rotor, and an induction motor may be adopted as the motor 2.

Electric power is supplied to the motor 2 from an electric storage device (not shown) through an inverter (not shown) that changes direct current supplied from the electric storage device to alternating current. By contrast, alternate current generated by the motor 2 is delivered to the electric storage device while being changed to direct current by the inverter.

The motor 2 is configured not only to generate a torque to be added to a torque generated by the engine 1, but also to generate a torque to reduce the torque generated by the engine 1. In addition, the motor 2 may also serve as a vibration damper to damp pulsation of the torque delivered to the motor 2. Specifically, the pulsation of the torque delivered to the motor 2 can be damped by generating a torque by the motor 2 in such a manner as to pulsate in the opposite phase to the phase of pulsation of the torque delivered to the motor 2. In the example shown in FIG. 1, an extra member E including a disconnecting clutch is interposed between the motor 2 and the output shaft 8 to interrupt torque transmission therebetween. Instead, a rotor of the motor 2 may also be integrated with the output shaft 8.

A leading end of the output shaft 8 is connected to a torque converter 9 as a fluid coupling that transmits torque through oil held therein. That is, the output shaft 8 serves as an input shaft of the torque converter 9. Specifically, the torque converter 9 comprises: a front cover 10 that is joined to the output shaft 8; a pump impeller (not shown) that is integrated with the front cover 10; a turbine runner (not shown) that is opposed to the pump impeller while being joined to an output shaft 11 of the torque converter 9; and a stator (not shown) that is interposed between the pump impeller and the turbine runner to orient the oil flowing from the pump impeller toward the turbine runner.

According to the example shown in FIG. 1, the front cover 10 comprises: an annular inner wall section 12 that is integrated with the output shaft 8; a cylindrical section 13 as a projection that is joined to a radially outermost portion of the inner wall section 12; an annular outer wall section 14 that expands radially outwardly from a leading end of the cylindrical section 13; and a domed housing 15 that is joined to a radially outermost portion of the outer wall section 14. The above-mentioned pump impeller is integrated with an inner surface of the housing 15. Specifically, the cylindrical section 13 protrudes from a case of the torque converter 9 in an axial direction. The above-mentioned turbine runner and the stator are held in the housing 15, and the housing 15 is filled with the oil.

A pendulum damper 16 is mounted on the cylindrical section 13. In the pendulum damper 16, an inertia body 17 oscillates in response to pulsation of the torque delivered to the pendulum damper 16 to damp the pulsation of the torque by an inertia torque of the inertia body 17 acting in an opposite direction to the torque delivered to the pendulum damper 16. For example, the pendulum damper 16 comprises: an annular rotating body 18 fitted onto the cylindrical section 13; one or more disc-shaped connection members (not shown) held by the rotating body 18 each of which are allowed to reciprocate in a radial direction; and an annular member serving as the inertia body 17 arranged around the rotating body 18. In the pendulum damper 16 of this kind, the connection members are centrifugally displaced radially outwardly by rotating the rotating body 18 to be contacted to arcuate raceway surfaces formed on an inner edge of the inertia body 17, and oscillated along the raceway surfaces by the pulsation of the torque rotating the rotating body 18 thereby damping the pulsation.

Instead, a pendulum damper comprising an annular rotating body 18 fitted onto the cylindrical section 13, and one or more rollers each of which serves as the inertia body 17, may also be adopted as the pendulum damper 16. In this case, the rollers are held in e.g., kidney-shaped chambers formed in the rotating body 18, and the rollers are centrifugally displaced radially outwardly by rotating the rotating body 18 to be contacted to radially outer edges of the chambers serving as raceway surfaces. In this situation, the rollers are oscillated along radially outer edges of the chambers by the pulsation of the torque rotating the rotating body 18 thereby damping the pulsation.

In the pendulum damper 16, geometry of the raceway surface and a weight of the inertia body 17 are determined in such a manner as to equalize the number of oscillations of the inertia body 17 per revolution with the number of pulsations of the engine torque per revolution. That is, given that the engine 1 is a four-stroke engine, the inertia body 17 is tuned to oscillate in a secondary oscillation mode.

The torque converter 9 further comprises a lockup clutch 19 as an engagement device that transmits torque between the front cover 10 and the output shaft 11 without fluid. Specifically, the lockup clutch 19 comprises: an input member 20 as a rotary member connected to the front cover 10; and an output member 21 also as a rotary member connected to the output shaft 11. An engagement mode of the lockup clutch 19 may be selected from a complete engagement mode and a slip engagement mode. In the complete engagement mode, the input member 20 is engaged completely with the output member 21 so that the input member 20 and the output member 21 are rotated integrally at same speeds. By contrast, in the slip engagement mode, the input member 20 is engaged with the output member 21 while slipping such that the input member 20 and the output member 21 are rotated at different target speeds.

According to the example shown in FIG. 1, the lockup clutch 19 is arranged in radially inner side of the cylindrical section 13. In the lockup clutch 19 as a multiple plate clutch, specifically, a plurality of the input members 20 and a plurality of the output members 21 are juxtaposed alternately in the axial direction. One of the sets of the input members 20 and the output members 21 is pushed by e.g., a piston (not shown) toward the other one of sets of the input members 20 and the output members 21 thereby allowing the lockup clutch 19 to transmit torque at desired torque capacity. For example, a speed difference between the input members 20 and the output members 21 may be adjusted to a target value by: calculating a current speed difference between the input members 20 and the output members 21 based on a speed of the engine 1 or the motor 2 detected by a sensor and an input speed to an after-mentioned transmission 22 detected by another sensor; and thereafter adjusting a pushing load applied to the input members 20 or the output members 21 by a feedback method while employing the calculated speed difference as a deviation.

By thus engaging the lockup clutch 19 while slipping, it is possible to transmit torque from the front cover 10 to the output shaft 11, while damping pulsation of the torque rotating the front cover 10 in accordance with a speed difference between the input members 20 and the output members 21 (i.e., a slip speed). Specifically, pulsation of the torque can be damped more effectively by increasing the speed difference between the input members 20 and the output members 21.

In the vehicle Ve shown in FIG. 1, the output shaft 11 of the torque converter 9 is joined to the transmission 22, and an output shaft of the transmission 22 is connected to a pair of drive wheels through a differential gear unit and driveshafts (neither of which are shown). According to the embodiment of the present disclosure, not only a conventional geared transmission but also a conventional continuously variable transmission may be adopted as the transmission 22.

According to the example shown in FIG. 1, the motor 2, the torque converter 9, and the pendulum damper 16 are held in a housing 23.

In the vehicle Ve, the output torque of the engine 1 is delivered to the spring damper 4, the motor 2, the pendulum damper 16, and the lockup clutch 19 in order, and an amplitude of pulsation of the torque being delivered is damped by those members 4, 2, 16 and 19. Thus, the spring damper 4, the motor 2, the pendulum damper 16, and the lockup clutch 19 are arranged in order on a transmission route of the torque generated by the engine 1 to form the torsional vibration damper.

Specifically, the output torque of the engine 1 is delivered to the spring damper 4. In the spring damper 4, the torque delivered from the engine 1 to the input plate 5 is further delivered to the output plate 6 through the coil spring 7, and consequently the pulsation of the torque is damped in accordance with a constant of the coil spring 7.

The pulsation of the torque is further damped by controlling a torque of the motor 2. Here, it is to be noted that a frequency of the current possible to be controlled by the inverter is limited. Therefore, the pulsation of the torque may not be damped by the motor 2 if the engine 1 is operated at a high speed.

The torque is further delivered from the motor 2 to the pendulum damper 16 through the front cover 10 of the torque converter 9. As described, the pendulum damper 16 is tuned to equalize the number of oscillations of the inertia body 17 per revolution with the number of pulsations per revolution at which an amplitude of the engine torque is widest. In addition, the number of pulsations of the torque per revolution will not be changed even after it is damped by the spring damper 4 and the motor 2. That is, the number of pulsations of the torque delivered to the front cover 10 per revolution is still equal to the number of oscillations of the inertia body 17 per revolution, and hence the pulsation of the front cover 10 can be damped effectively by the oscillating motion of the inertia body 17.

The torque delivered to the input members 20 through the front cover 10 is further delivered to the output member 21 by engaging the lockup clutch 19. In this situation, pulsation of the torque being delivered from the input members 20 to the output members 21 is further damped by slipping the lockup clutch 19. The number of pulsations of the torsional vibrations resulting from combustion of the engine 1 is reduced as a result of transmitting the torque from the front cover 10 to the output shaft 11 while slipping the lockup clutch 19. That is, the number of torque pulses per revolution at which an amplitude of the torque rotating the output shaft 11 is widest is reduced smaller than the number of torque pulses per revolution at which an amplitude of the torque rotating the front cover 10 is widest.

In the torsional vibration damper according to the exemplary embodiment of the present disclosure, therefore, the pendulum damper 16 tuned to damp the secondary vibration resulting from combustion of the engine torque is disposed upstream of lockup clutch 19.

Figure 2:
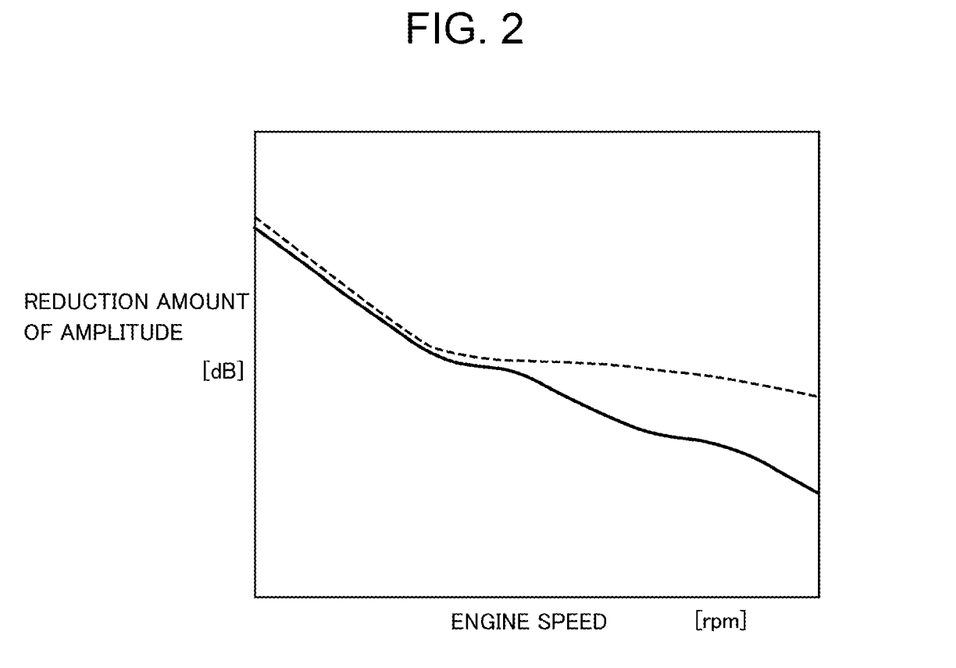
FIG. 2 is a graph indicating a vibration damping effect of the torsional vibration damper according to the present disclosure.

Turning to FIG. 2, there is shown a vibration damping effect of the torsional vibration damper according to the exemplary embodiment of the present disclosure. In FIG. 2, specifically, the solid curve represents an amount of reduction in an amplitude pulsation of the engine torque with respect to a speed of the engine 1. As described, in the torsional vibration damper according to the exemplary embodiment of the present disclosure, the spring damper 4, the motor 2, the pendulum damper 16, and the lockup clutch 19 are arranged in order from the engine 1. On the other hand, the dashed curve represents an amount of reduction in an amplitude pulsation of the engine torque by a conventional torsional vibration damper in which the spring damper, the motor, the lockup clutch, and the pendulum damper are arranged in order from the engine.

As described, the number of pulsations of the torsional vibrations resulting from combustion of the engine 1 is reduced as a result of transmitting the torque from the front cover 10 to the output shaft 11 while slipping the lockup clutch 19. Therefore, if the pendulum damper tuned to damp the vibrations resulting from combustion of the engine torque is disposed downstream of the lockup clutch as in the conventional torsional vibration damper, the vibration damping performance is reduced as indicated by the dashed curve in FIG. 2.

On the other hand, according to the exemplary embodiment of the present disclosure, the pendulum damper 16 tuned to damp the secondary vibration resulting from combustion of the engine torque is disposed upstream of lockup clutch 19. That is, pulsations of the torque before the number of pulsations is reduced by the lockup clutch 19 is damped by the pendulum damper 16.

According to the exemplary embodiment of the present disclosure, therefore, amplitude of pulsation of the engine torque can be damped more effectively compared to the conventional art.

In addition, in the torsional vibration damper shown in FIG. 1, the pendulum damper 16 is mounted on the cylindrical section 13. Therefore, the centrifugal force acting on the inertia body 17 is increased so that an inertial force of the inertia body 17 can be increased to further improve the vibration damping performance of the pendulum damper 16. In other words, a weight of the inertia body 17 to achieve a desired vibration damping performance can be reduced, and hence the pendulum damper 16 can be downsized. Further, since the rotating body 18 is supported by the front cover 10 that is rotated together therewith, a mass of the rotating body 18 may be reduced. Therefore, a mass ratio of the rotating body 18 to the inertia body 17 can be reduced to further improve the vibration damping performance of the pendulum damper 16.

Furthermore, the rotating body 18 has a sufficient thickness to ensure a required rigidity of the pendulum damper 16. Therefore, even if a multiple plate clutch is adopted as the lockup clutch 19, an axial length of the torsional vibration damper will not be elongated by arranging the lockup clutch 19 in the radially inner side of the pendulum damper 16. Here, in order to prevent intrusion of foreign matter and to reduce an oil steering loss, it is preferable to cover the inertia body 17. However, according to the exemplary embodiment of the present disclosure, the pendulum damper 16 is held in the housing 23 together with the motor 2. For this reason, it is not necessary to arrange a dedicated casing for covering the inertia body 17. Otherwise, in a case of covering the inertia body 17 by a dedicated casing, a required rigidity of the dedicated casing is rather low, and hence a light weight cover may be used to cover the inertia body 17.

Figure 3:
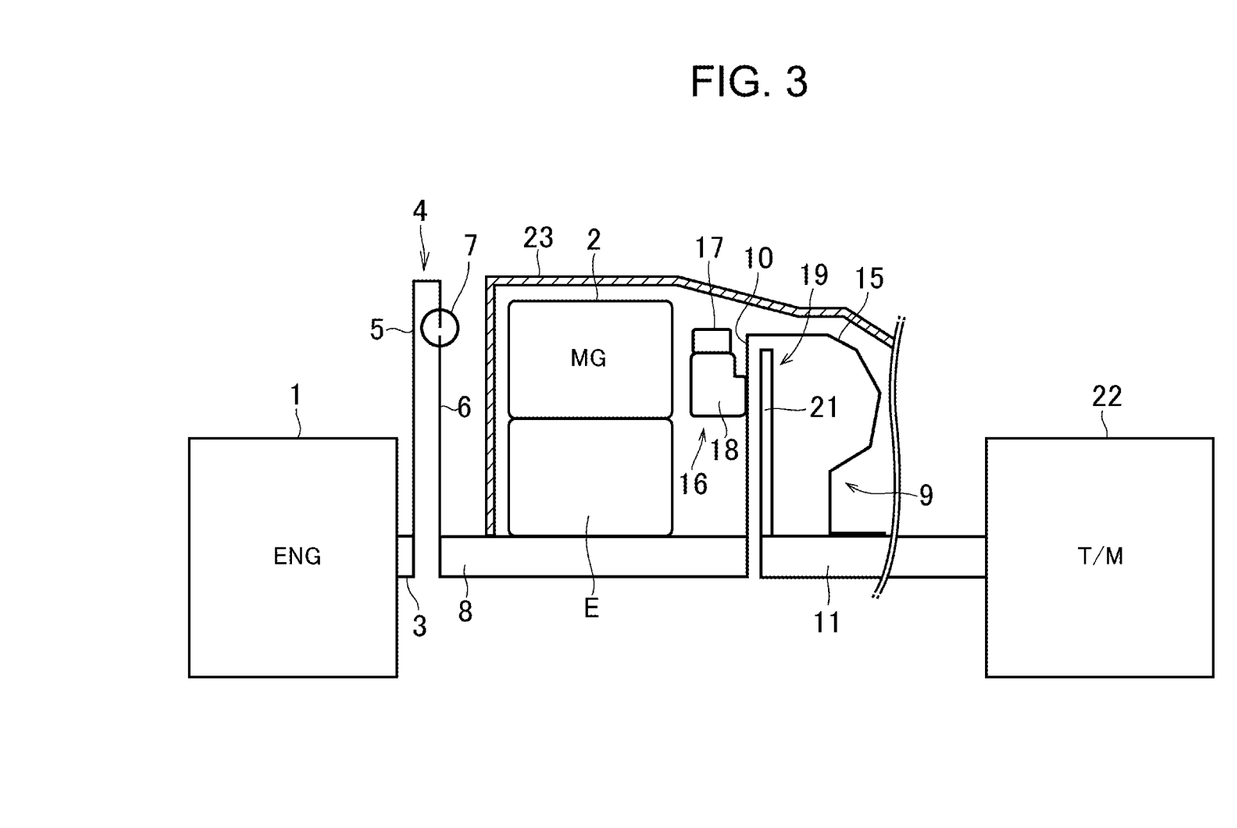
FIG. 3 is a schematic illustration showing a second example of the torsional vibration damper according to the present disclosure arranged in a vehicle.

Turning to FIG. 3, there is shown a second example of the torsional vibration damper according to the present disclosure in which the pendulum damper 16 is connected to a side wall of the front cover 10. According to the second example shown in FIG. 3, the front cover 10 is shaped into an annular plate without having the cylindrical section 13, and the rotating body 18 of the pendulum damper 16 is joined to an outer surface of the side wall of the front cover 10. According to the second example, therefore, a clearance is maintained between an inner circumferential surface of the rotating body 18 and an outer circumferential surface of the output shaft 8. The remaining structures of the pendulum damper 16 shown in FIG. 3 are similar to those of the pendulum damper 16 shown in FIG. 1.

According to the second example, the lockup clutch 19 is arranged in an opposite side to the pendulum damper 16 across the front cover 10. Specifically, an annular plate serving as the output member 21 is mounted on the output shaft 11 while maintaining a predetermined clearance from an inner surface of the front cover 10. According to the second example, the output member 21 is pushed hydraulically in the torque converter 9 toward the front cover 10 by reducing a hydraulic pressure acting between the front cover 10 and the output member 21. Consequently, the output member 21 comes into contact to the front cover 10 to transmit torque. That is, the front cover 10 serves as the input member 20 of the lockup clutch 19.

Thus, according to the second example, the pendulum damper 16 is connected to the front cover 10. According to the second example, therefore, pulsations of the torque before reducing the number of pulsations by the lockup clutch 19 is damped effectively by the pendulum damper 16 tuned to damp the secondary vibration resulting from combustion of the engine torque. In addition, since the rotating body 18 is supported by the front cover 10 that is rotated integrally therewith, a mass of the rotating body 18 may also be reduced as the first example. Therefore, a mass ratio of the rotating body 18 to the inertia body 17 may also be reduced to further improve the vibration damping performance of the pendulum damper 16.

Further, according to the second example, a diameter of the lockup clutch 19 may be increased so that a thickness of the output member 21 may be reduced. Furthermore, since the front cover 10 serves as the input member 20, an axial length of the lockup clutch 19 may be reduced.

Figure 4:
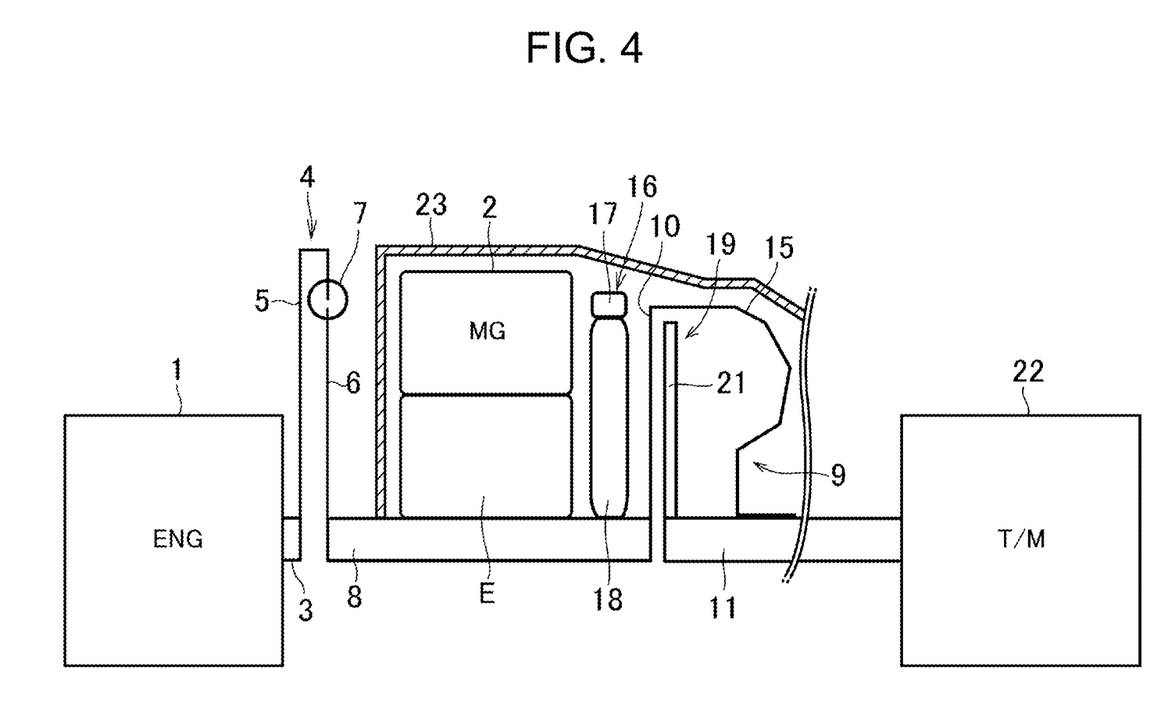
FIG. 4 is schematic illustration showing a third example of the torsional vibration damper according to the present disclosure arranged in a vehicle.

Turning to FIG. 4, there is shown a third example of the torsional vibration damper according to the present disclosure. As illustrated in FIG. 4, the pendulum damper 16 may also be mounted on the output shaft 8.

Figure 5:
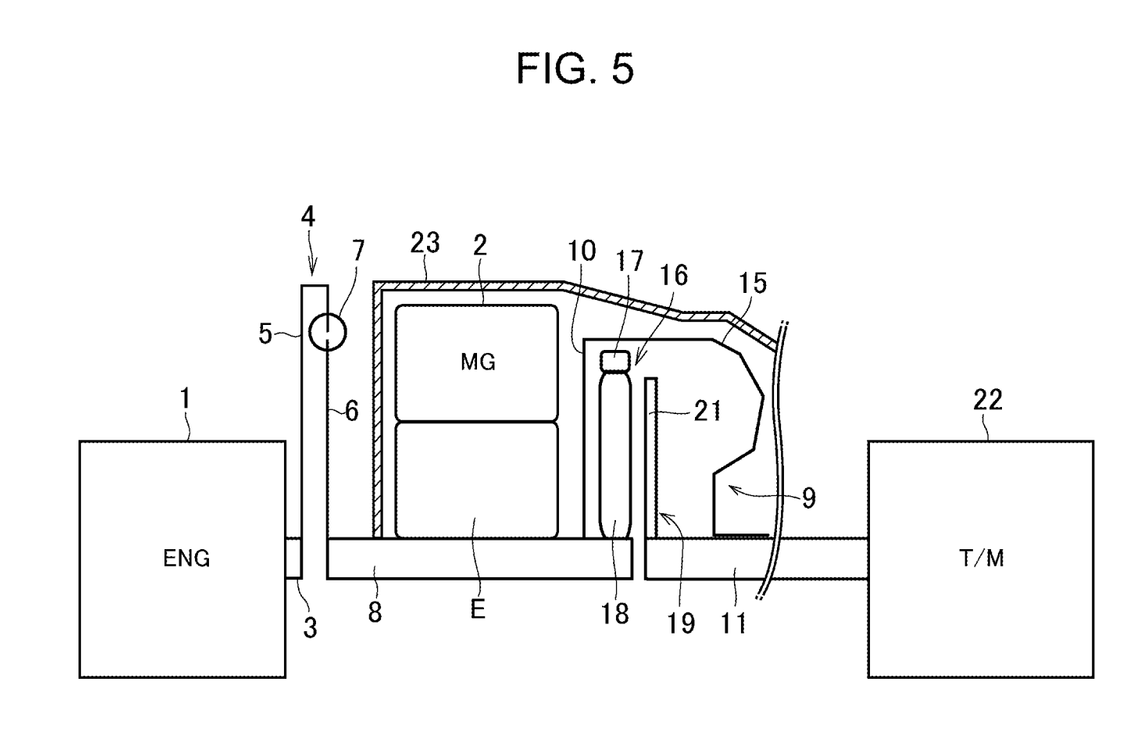
FIG. 5 is a schematic illustration showing a fourth example of the torsional vibration damper according to the present disclosure arranged in a vehicle.

Turning to FIG. 5, there is shown a fourth example of the torsional vibration damper according to the present disclosure in which the pendulum damper 16 is held in the torque converter 9. According to the fourth example, specifically, the pendulum damper 16 is opposed to the inner surface of the side wall of the front cover 10, and the output member 21 of the lockup clutch 19 is disposed in an opposite side to the front cover 10 across the pendulum damper 16. According to the fourth example, therefore, torque is transmitted by engaging the rotating body 18 with the output member 21. That is, the rotating body 18 is adapted to serve as the input member 20 of the lockup clutch 19.

Since the rotating body 18 serves as the input member 20 of the lockup clutch 19, an axial length of the torque converter 9 including the lockup clutch 19 may be reduced.

Although the above exemplary embodiments of the present disclosure have been described, it will be understood by those skilled in the art that the present disclosure should not be limited to the described exemplary embodiments, and various changes and modifications can be made within the scope of the present disclosure. For example, the torsional vibration damper according to the exemplary embodiment of the present disclosure may also be arranged in a vehicle in which only an engine serves as a prime mover. That is, the motor serving as a vibration damper may be omitted. In addition, the spring damper 4 may also be omitted according to need.

Further, other kinds of clutches such as a starting clutch may also be employed to selectively interrupt torque transmission between the drive wheels and the engine, instead of the clutch device arranged in the torque converter. That is, any kinds of clutches in which a pair of rotary members being allowed to rotate relatively to each other to transmit torque may be employed in the torsional vibration damper according to the present disclosure.

What is claimed is:

1. A torsional vibration damper comprising:
   a housing that is rotated integrally with an input shaft to which a torque is delivered from an engine;
   a fluid coupling that transmits the torque to an output shaft through a fluid held in the housing;
   a pendulum vibration damper that damps an amplitude of pulsation of the torque delivered thereto from the engine by an oscillating motion of an inertia body in response to the pulsation of the torque; and
   an engagement device having a pair of rotary members that damps the amplitude of the pulsation of the torque by allowing the rotary members to rotate at different speeds while transmitting the torque therebetween, wherein:
      the pendulum vibration damper and the engagement device are arranged in order on a transmission route of the torque of the engine, from a side at which the engine is disposed, and
      the pendulum vibration damper is held in the housing and further includes a rotating body connected to the input shaft that serves as one of the rotary members of the engagement device, and the other one of the rotary members is connected to the output shaft.

2. The torsional vibration damper as claimed in claim 1, wherein the pendulum vibration damper is tuned to equalize the number of oscillations of the inertia body per revolution with the number of pulsations of the torque of the engine per revolution.

3. The torsional vibration damper as claimed in claim 1, wherein the pendulum vibration damper is connected to an outer surface of the housing.

4. The torsional vibration damper as claimed in claim 3, wherein the housing includes a projection protruding therefrom in an axial direction,
   the pendulum vibration damper is mounted on the projection, and
   the engagement device is arranged in a radially inner side of the projection.

5. The torsional vibration damper as claimed in claim 3, wherein the housing includes an annular plate section connected to the input shaft to serve as said one of the rotary members of the engagement device,
   the pendulum vibration damper is connected to the annular plate section, and
   said other one of the rotary members of the engagement device is arranged in the housing.

6. The torsional vibration damper as claimed in claim 1, further comprising a spring damper including:
   an input plate that is connected to the engine;
   an output plate that is allowed to rotate relatively to the input plate; and
   an elastic member that is arranged in rotational directions of the input plate and the output plate.

7. A torsional vibration damper comprising:
   a pendulum vibration damper that damps an amplitude of pulsation of torque delivered thereto from an engine by an oscillating motion of an inertia body in response to the pulsation of the torque;
   an engagement device having a pair of rotary members that damps the amplitude of the pulsation of the torque by allowing the rotary members to rotate at different speeds while transmitting the torque therebetween; and
   a motor that is connected to a transmission route of the torque, wherein:
      the pendulum vibration damper and the engagement device are arranged in order on the transmission route of the torque of the engine, from a side at which the engine is disposed, and
      the motor damps the amplitude of the pulsation of the torque generated by the engine, by generating a torque pulsating in an opposite phase to a phase of the pulsation of the torque generated by the engine.

8. The torsional vibration damper as claimed in claim 7, further comprising:
   another housing, and
   wherein the motor, the pendulum vibration damper, and the engagement device are arranged in said another housing.

* * * * *